(12) United States Patent
Huber et al.

(10) Patent No.: US 6,547,477 B1
(45) Date of Patent: Apr. 15, 2003

(54) CONNECTING FITTING

(75) Inventors: Edgar Huber, Hard (AT); Klaus Bereuter, Dornbirn (AT)

(73) Assignee: Julius Blum Gesellschaft m.b.H., Höchst (AT)

( * ) Notice: Subject to any disclaimer, the term of this patent is extended or adjusted under 35 U.S.C. 154(b) by 0 days.

(21) Appl. No.: 09/557,965

(22) Filed: Apr. 25, 2000

(30) Foreign Application Priority Data

Apr. 26, 1999 (AT) ................................................. 733/99

(51) Int. Cl.⁷ ............................ F16B 12/20; F16B 12/10
(52) U.S. Cl. ........................ 403/322.4; 403/DIG. 13; 403/DIG. 8; 403/231; 403/321; 403/297
(58) Field of Search ........................... 403/322.4, 231, 403/321, DIG. 8, DIG. 13, 297

(56) References Cited

U.S. PATENT DOCUMENTS

| | | | | |
|---|---|---|---|---|
| 1,602,658 A | * | 10/1926 | Germain | ............... 403/381 |
| 2,815,997 A | * | 12/1957 | Korb | ................... 403/52 |
| 3,456,969 A | * | 7/1969 | Wittenmayer | |
| 3,730,568 A | * | 5/1973 | Giovannetti | |
| 4,060,949 A | * | 12/1977 | Busse | .......... 403/DIG. 12 |
| 4,361,931 A | * | 12/1982 | Schnelle et al. | |
| 4,895,473 A | * | 1/1990 | Hennick | ....... 403/DIG. 12 |
| 4,944,627 A | * | 7/1990 | Durney | ......... 403/DIG. 12 |
| 5,611,637 A | * | 3/1997 | Brustle et al. | |
| 5,667,327 A | * | 9/1997 | Salice | |
| 5,762,442 A | * | 6/1998 | Salice | |
| 6,257,796 B1 | * | 7/2001 | Salice | |

FOREIGN PATENT DOCUMENTS

| | | | | |
|---|---|---|---|---|
| AT | 334574 | | 1/1977 | |
| CH | SU 1295054 A | * | 3/1987 | ........... F16B/12/20 |
| DE | 334574 | * | 1/1977 | |
| DE | 2748272 | | 5/1979 | |
| DE | 2748272 A1 | * | 5/1979 | |
| FR | 1449806 A | * | 8/1966 | |
| FR | 2575794 A | * | 7/1986 | |

* cited by examiner

Primary Examiner—Lynne H. Browne
Assistant Examiner—Ernesto Garcia
(74) Attorney, Agent, or Firm—Wenderoth, Lind & Ponack, L.L.P.

(57) ABSTRACT

A connecting fitting for releasably connecting two furniture parts is disclosed. The fitting comprises a pin-shaped member that is insertable into a hole in a first furniture part, and a fitting body insertable into a bore in a second furniture part. The fitting body comprises a tightening element. The fitting body is in the form of a circular cylindrical part defined by a curved side wall and a flat side wall. The fitting body is radially displaceable within said bore in the furniture part when not in a tightened position. The pin-shaped member protrudes from the curved side wall when in the tightened position.

30 Claims, 14 Drawing Sheets

CONNECTING FITTING

BACKGROUND OF THE INVENTION

1. Field of the Invention

The invention relates to a connecting fitting for releasably connecting furniture parts. The fitting comprises a pin-shaped member that is insertable into a hole in a first furniture part, and a fitting body that is insertable into a bore in a second furniture part. The fitting body comprises a tightening element.

2. Description of the Prior Art

Such a connecting fitting is, for example, described in Austrian patent AT 403 192 B.

SUMMARY OF THE INVENTION

It is an object of the invention to provide a connecting fitting which makes it possible to easily insert shelves or panels into a piece of furniture after the piece of furniture has been assembled.

According to the invention, this object is accomplished by the fitting body being in the form of a circular cylindrical part defined by a curved side wall and a flat side wall. The fitting body is radially displaceable within the bore in the furniture part when not in a tightened position, whereby the pin-shaped member protrudes from the curved side wall when it is in the tightened position.

With a fitting according to the invention it is possible to insert the fitting body into the bore in such a way that there is still room for the pin-shaped member. That is, the fitting body will be inserted in a tilted position. The pin-shaped member will then be moved through a corresponding hole in the shelf.

DESCRIPTION OF THE PREFERRED EMBODIMENTS

The drawings show the connection of a shelf 1 with a furniture side wall 2 by means of a connecting fitting according to the invention.

The furniture side wall 2 is provided with a bore 5. At a planar surface the shelf 1 is provided with a bore 3. The bore 3 does not extend completely through the shelf 1. The shelf 1 is further provided with a through bore 4 extending from a front face of the shelf 1 into the bore 3.

The connecting fitting according to the invention consists of a fitting body 6 in the form of a circular cylindrical part which is insertable into the bore 3 of the shelf 1, further of a pin-shaped part 10 protruding through the bore 4 and into the bore 5 in the furniture side wall 2, and further of a tightening element.

The length of the pin-shaped part 10 and of the fitting body 6 is advantageously shorter than the diameter of the bore 3 so that the connecting fitting can be easily inserted into the bore 3 as shown in FIGS. 4a–4d. In the embodiments shown the tightening element is in the form of a tilting lever or tiltable member 7. The tilting lever 7 is connected to a dowel part 8 by means of an axle 9. The dowel part 8 is preferably made of metal and is provided with two slots 28 which make expansion of dowel part 8 possible. The dowel part 8 is at its outside provided with ribs or teeth 27 which increase the hold of the dowel part 8 in the bore 5.

Within the dowel part 8 an expanding pin 25 is situated. The expanding pin 25 is rigidly connected to the fitting body 6, preferably riveted thereto. To mount the fitting body 6 within the shelf 1, the connecting fitting is inserted into the bore 3 as shown in FIGS. 4a–4d whereby the tilting lever 7 is in an upwardly tilted position. After insertion into the bore 3 the fitting body 6 is moved in such a way that the pin-shaped member 10 protrudes from the shelf 1 and into the bore 5 of the furniture side wall 2. This situation is shown in FIGS. 10 and 11.

In order to move the fitting body 6 within the bore 3 as shown in FIG. 4a–FIG. 4d, a length of a flat side wall of the fitting body 6 is less than a diameter of the bore 3 such that the fitting body 6 is radially displaceable within the bore 3.

Figure 1:
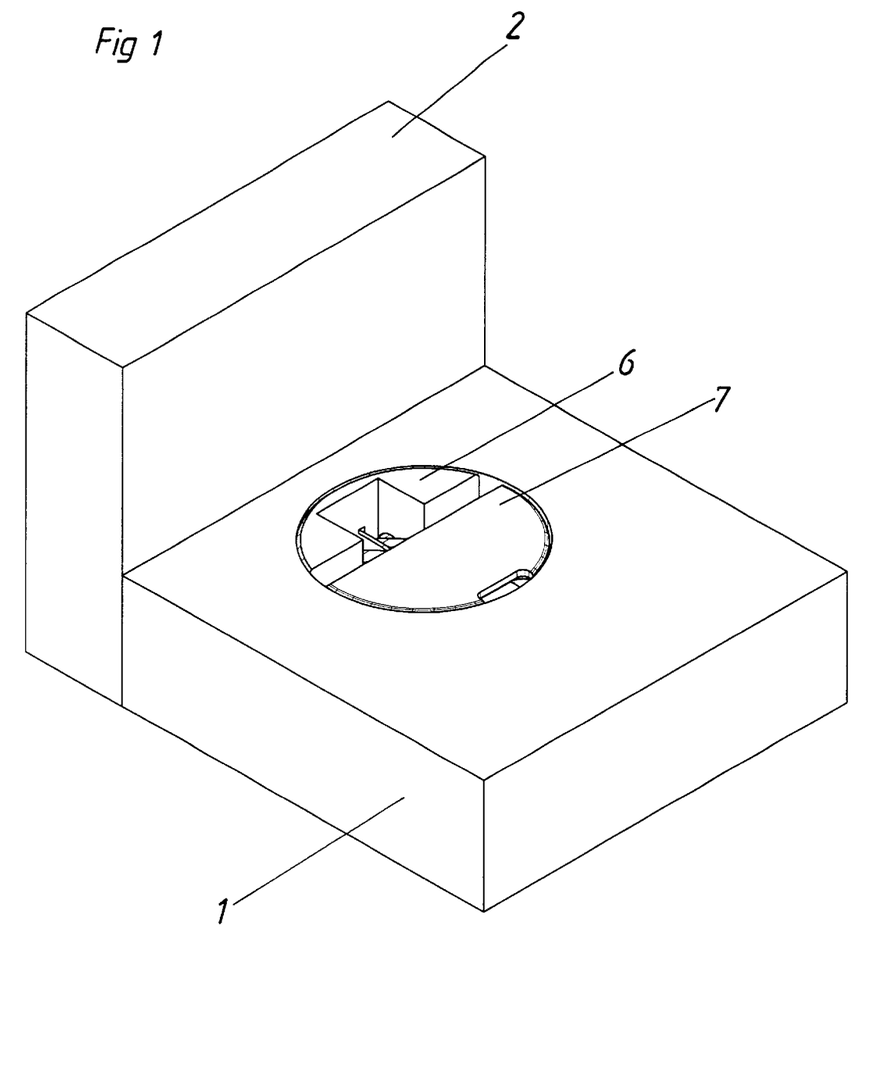
FIG. 1 is a perspective view showing two furniture parts connected by means of a connecting fitting according to the invention.
Figure 2:
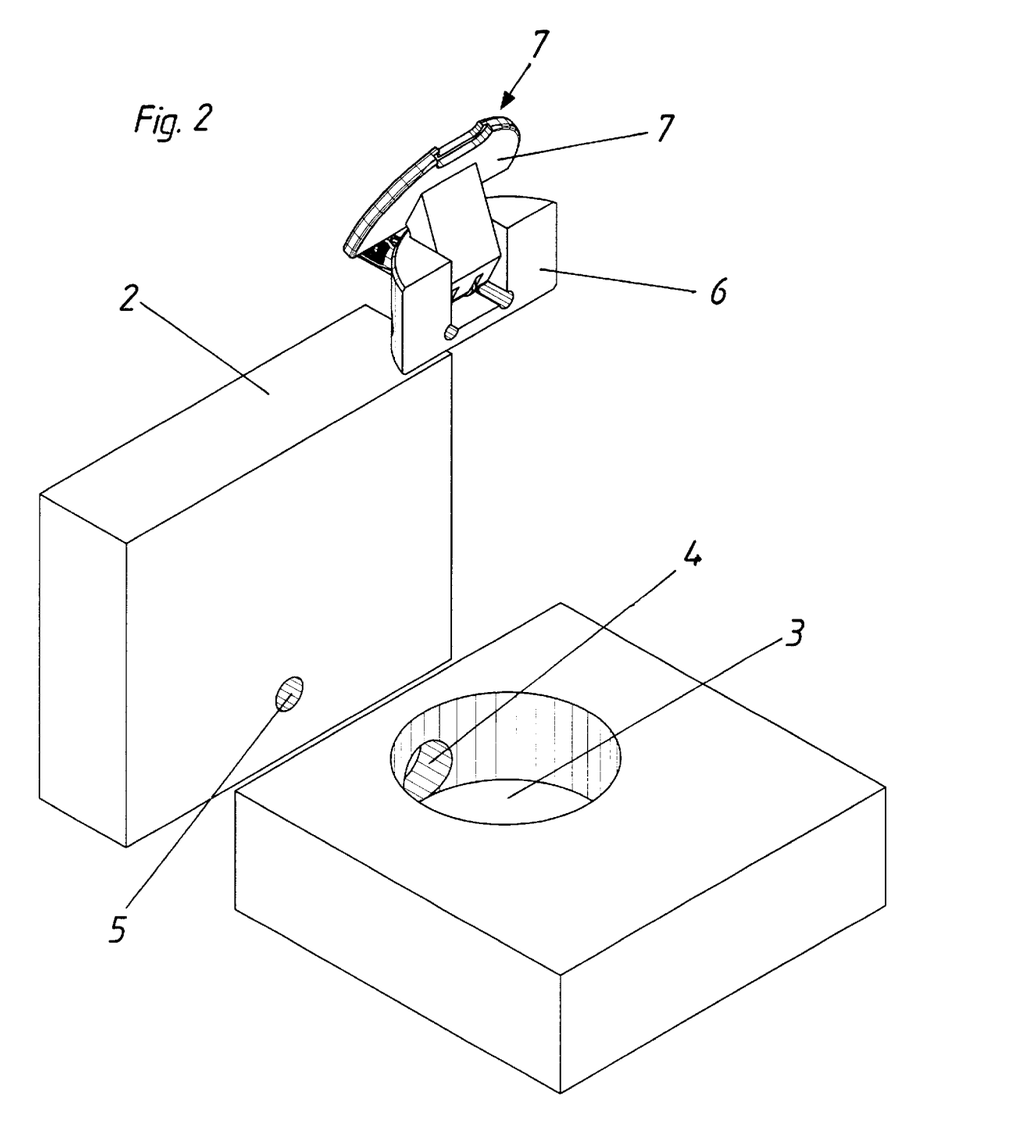
FIG. 2 is a perspective view of a furniture side wall, a shelf and a connecting fitting according to the invention, the parts being shown separately.
Figure 3:
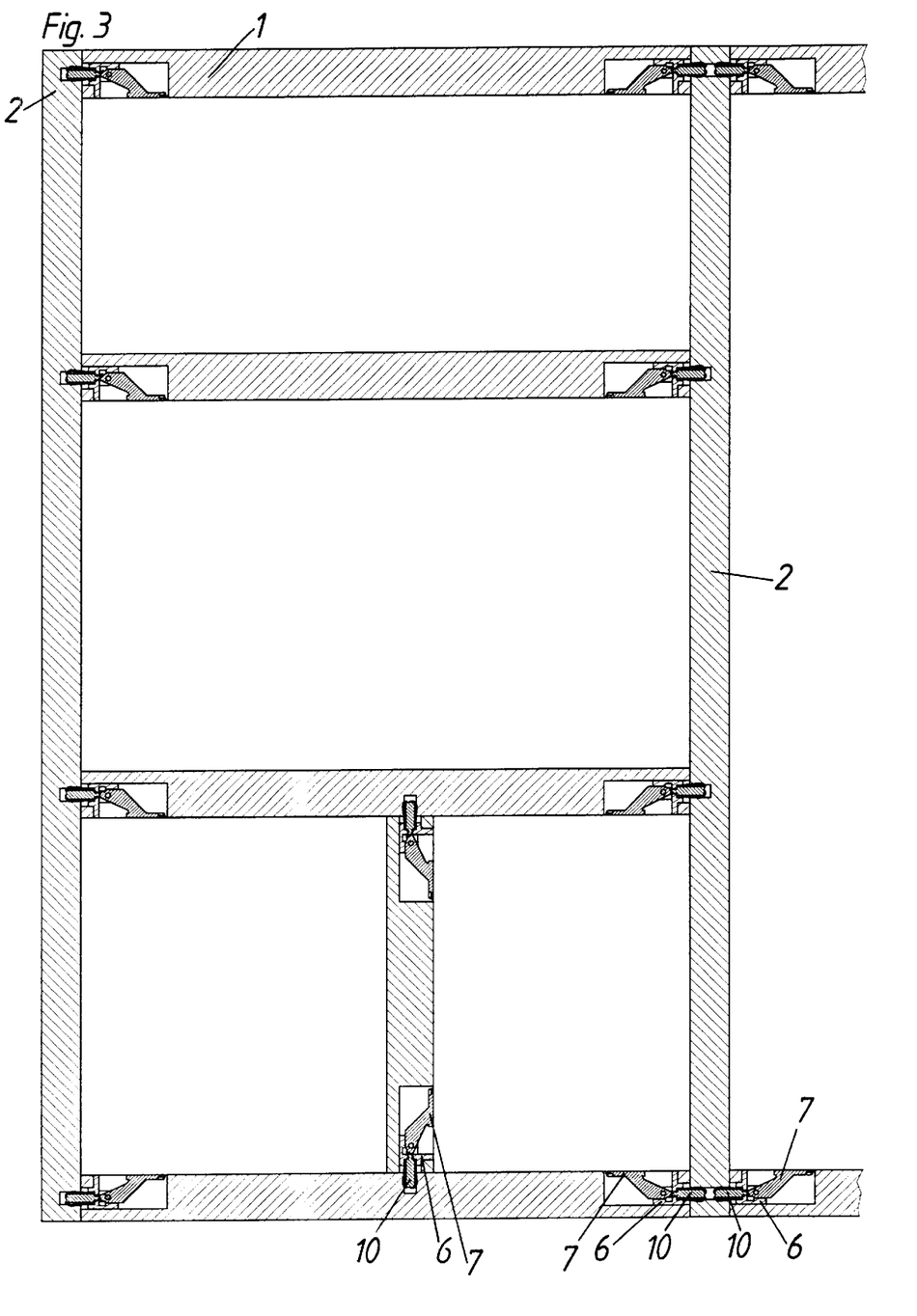
FIG. 3 is a sectional view through a furniture part in the region of a connecting fitting.
Figure 4A:
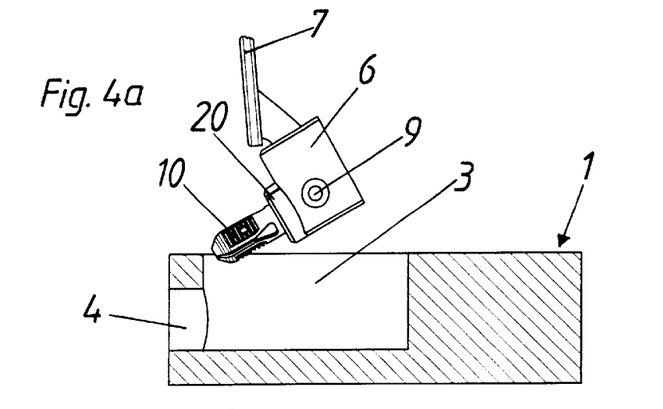
FIGS. 4a–4d each show a sectional view through a shelf and a side view of a connecting fitting, whereby the connecting fitting is shown at different stages of being inserted into the shelf.
Figure 4B:
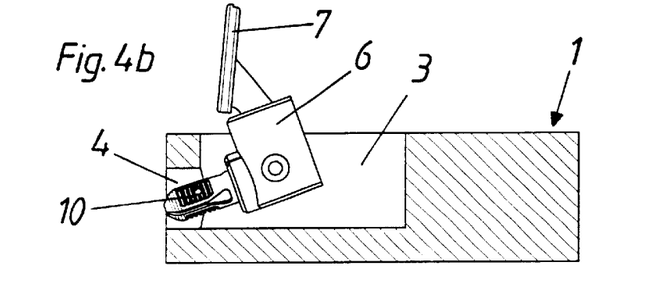
Figures 4C, 4D:
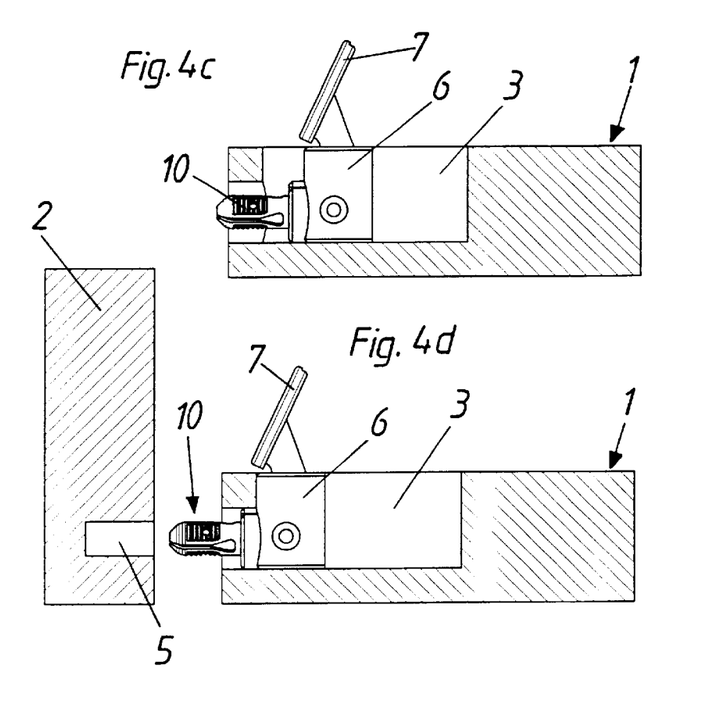
Figure 5:
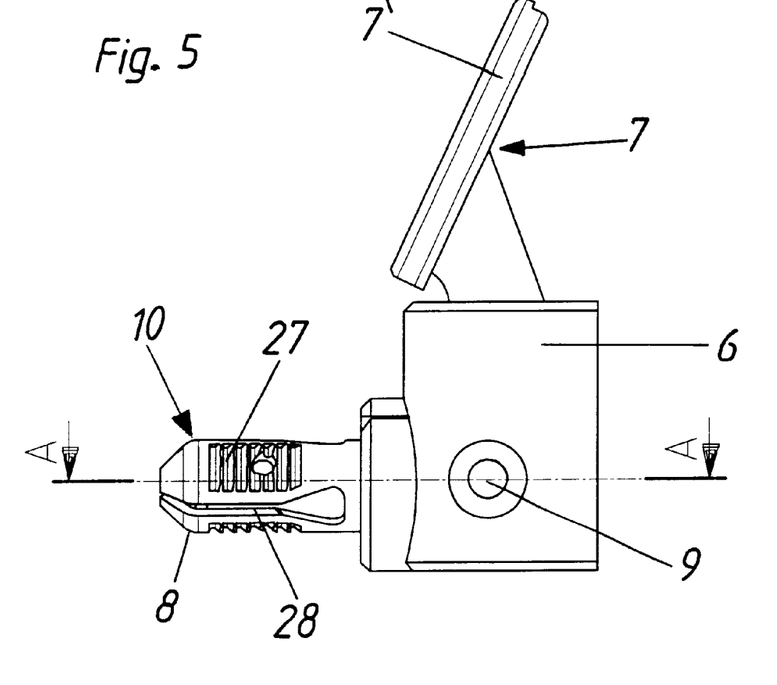
FIG. 5 is a side view of a connecting fitting according to the invention.
Figure 6:
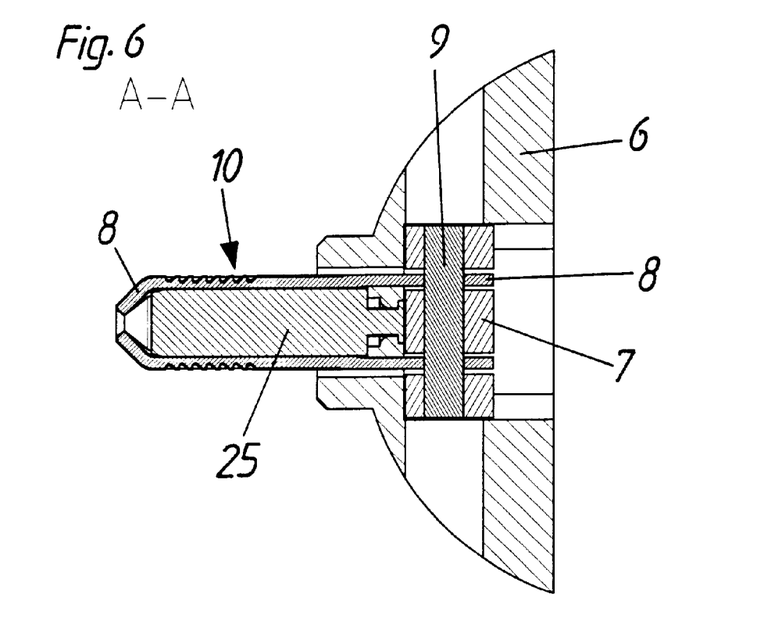
FIG. 6 is a sectional view taken along line A—A of FIG. 5.
Figures 7, 8, 9:
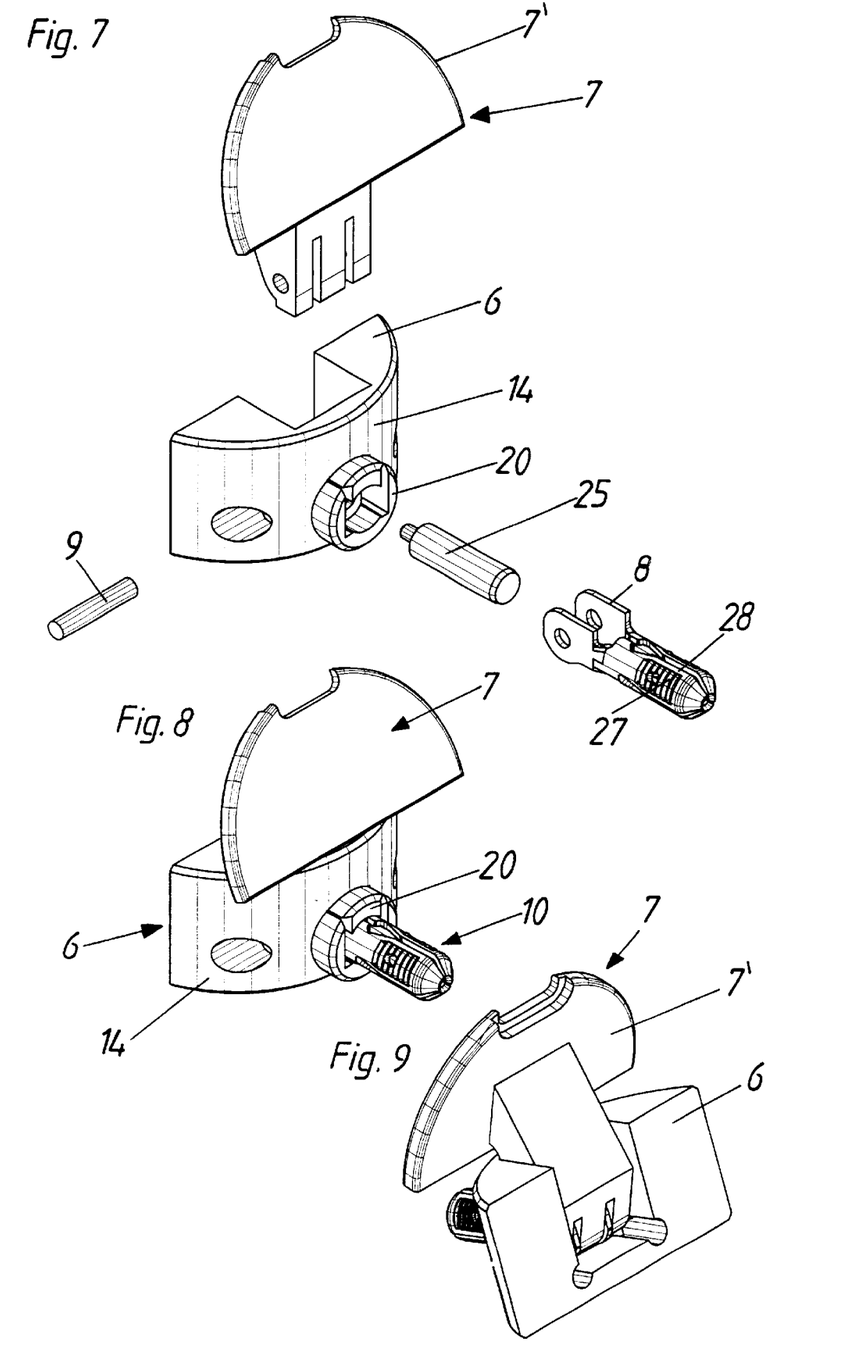
FIG. 7 is a perspective view of a connecting fitting according to the invention.
FIG. 8 is a perspective view of a connecting fitting according to the invention, whereby the curved wall is shown.
FIG. 9 is a perspective view of the connecting fitting, whereby the flat wall is shown.
Figures 10, 11:
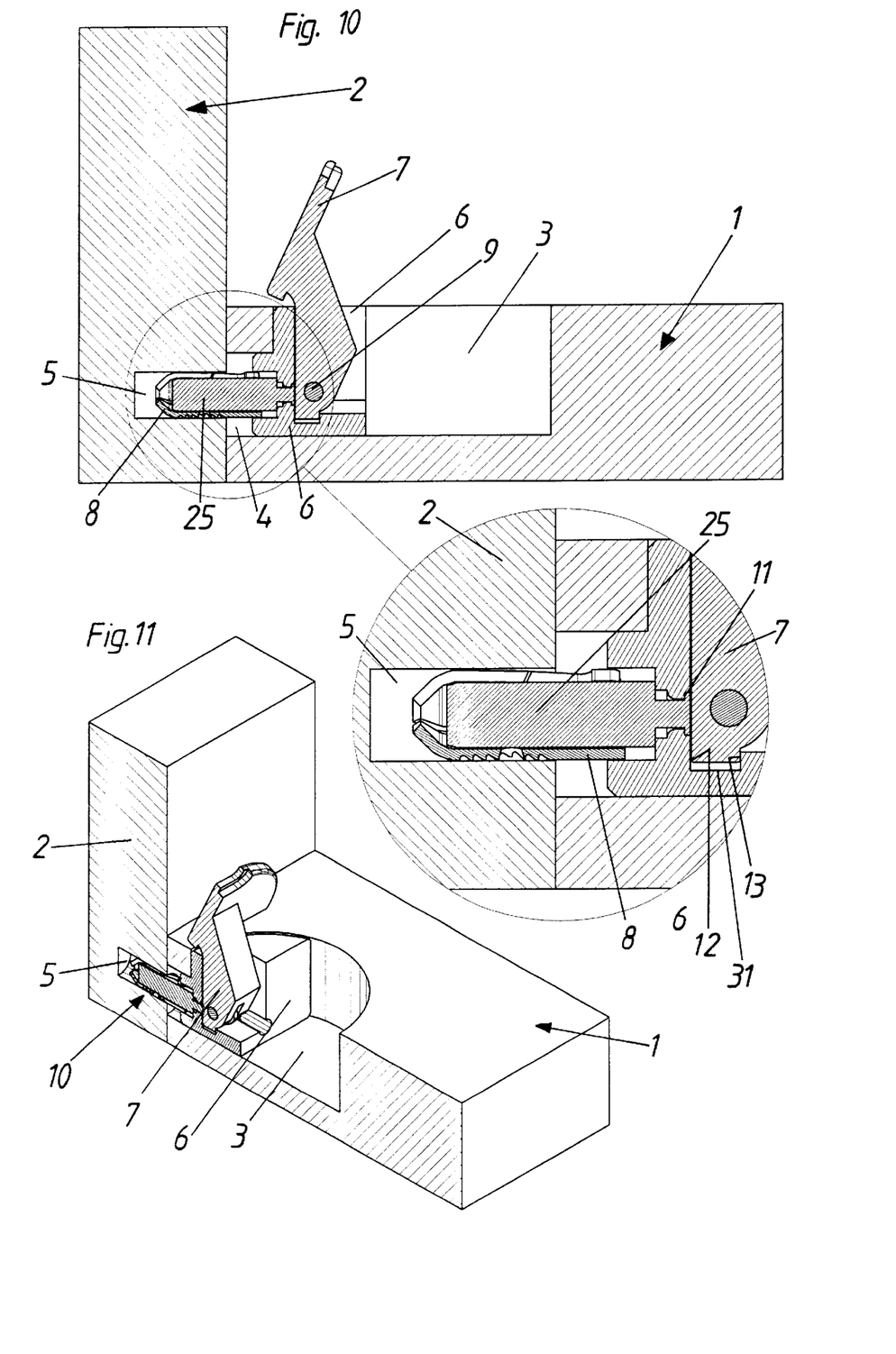
FIG. 10 is a vertical sectional view through a furniture side wall, a shelf and a connecting fitting showing the connecting fitting in the untightened position.
FIG. 11 is a perspective view of a furniture side wall, a shelf and a connecting fitting in the untightened position, whereby the parts are separately shown in section.
Figures 12, 13:
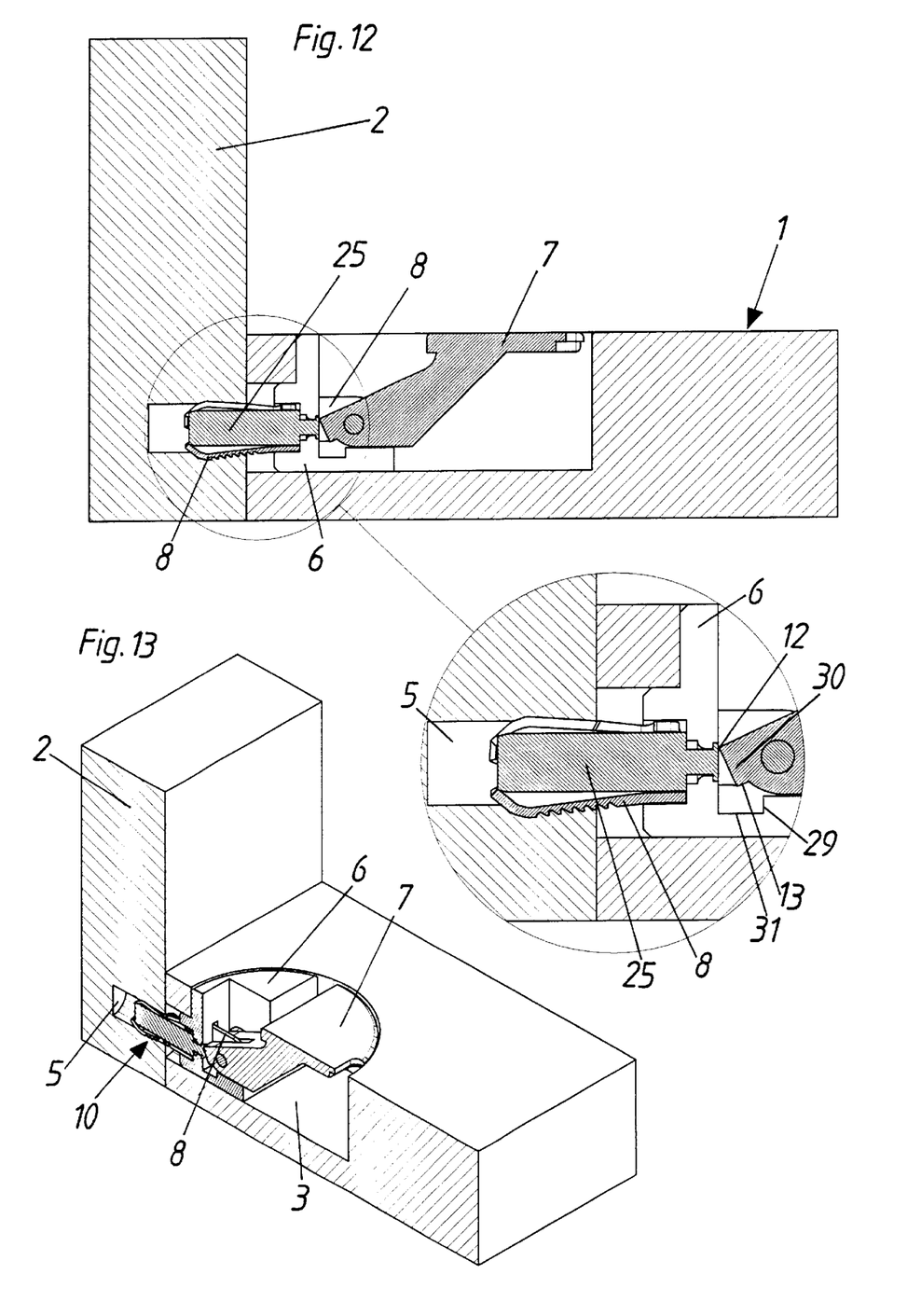
FIG. 12 is a vertical sectional view through a furniture side wall, a shelf and a connecting fitting, with the connecting fitting being in the tightened position.
FIG. 13 is a perspective view of a furniture side wall, a shelf and a connecting fitting, with the connecting fitting shown in the tightened position and the parts partly shown in section.

To tighten the shelf 1 to the furniture side wall 2 the tilting lever 7 is tilted from the position shown in FIGS. 10 and 11 into the position shown in FIGS. 12 and 13. To improve the stability of the fitting body 6 within the bore 3 the fitting body 6 is at its curved wall provided with a socket 20. The socket 20 is cylindrical and its outer diameter corresponds to the diameter of the bore 4 in the shelf 1.

With a connecting fitting according to the invention it is easily possible to mount shelves 1 in a piece of furniture as the connecting fitting can be inserted into the bore 3 in such a way that the pin-shaped part 10 does not extend outwardly from the front face of the shelf 1. After the shelf 1 is brought into its correct position the connecting fitting can be moved within the bore 3 so that the pin-shaped part 10 will extend into the bore 5 in the furniture side wall 2.

The curved wall of the fitting body 6 corresponds to the wall of the bore 3 so that the fitting body 6 will be held snugly at the wall of the bore 3.

The tilting lever 7 is provided with a cam 12 which in the tightened position presses against the inner wall of the fitting body 6 or against the head of the tightening pin 25. The tilting lever 7 is further provided with a nose 30 which in the non-tightened position abuts against a planar surface 29 on the fitting body 6 via a face 13. The nose 30 of the tilting lever 7 on which the cam 12 and the face 13 are provided is situated within a groove 31 in the fitting body 6.

In the embodiments shown in FIGS. 14 to 17 the pin-shaped member 10 is not directly held in the bore 5 of the furniture side wall 2, but is rather held in dowels 15, 16, 17, 18.

Figure 14:
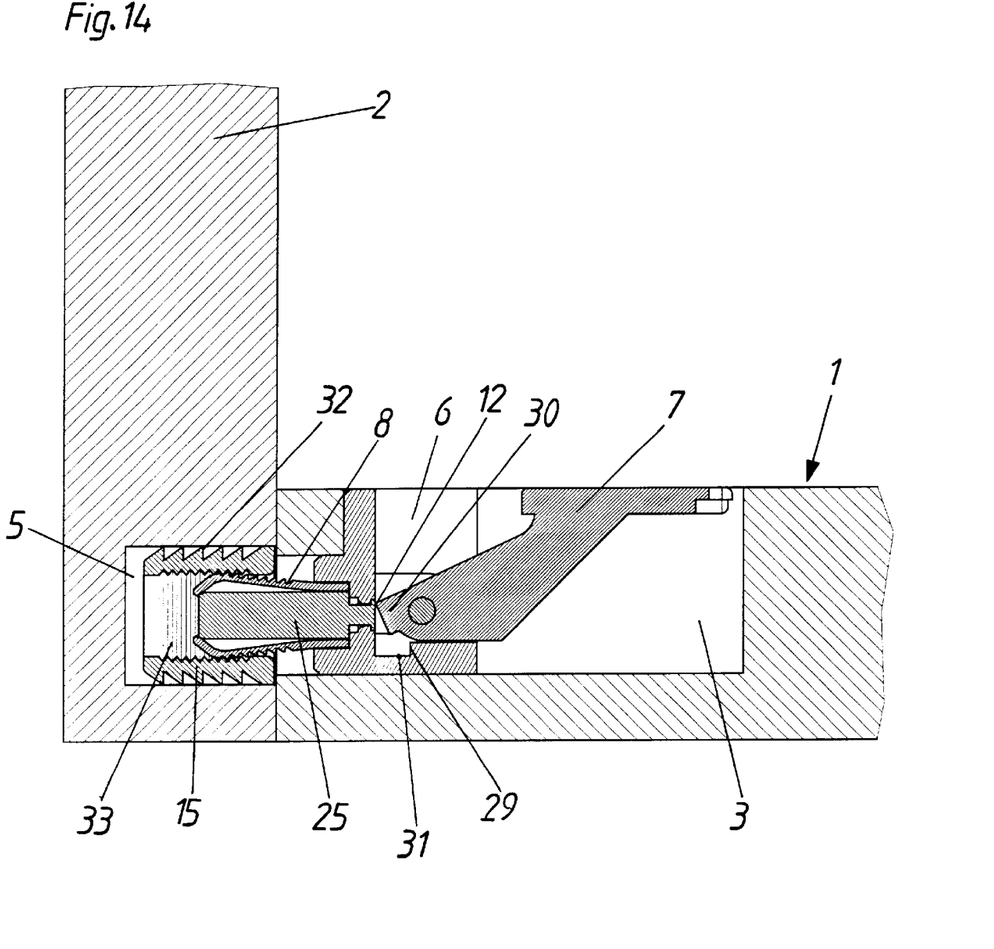
FIGS. 14–17 each show a sectional view through a furniture side wall, shelves and a connecting fitting according to the invention in the tightened position.

The dowel 15 is mounted in the bore 5 which is in the form of a blind hole. The dowel 15 is provided with ribs 32 which increase the hold of the dowel 15 in the bore 5, and is at is inner side provided with ribs 33 which co-act with ribs 27 on the dowel part 8 of the connecting fitting.

Figure 15:
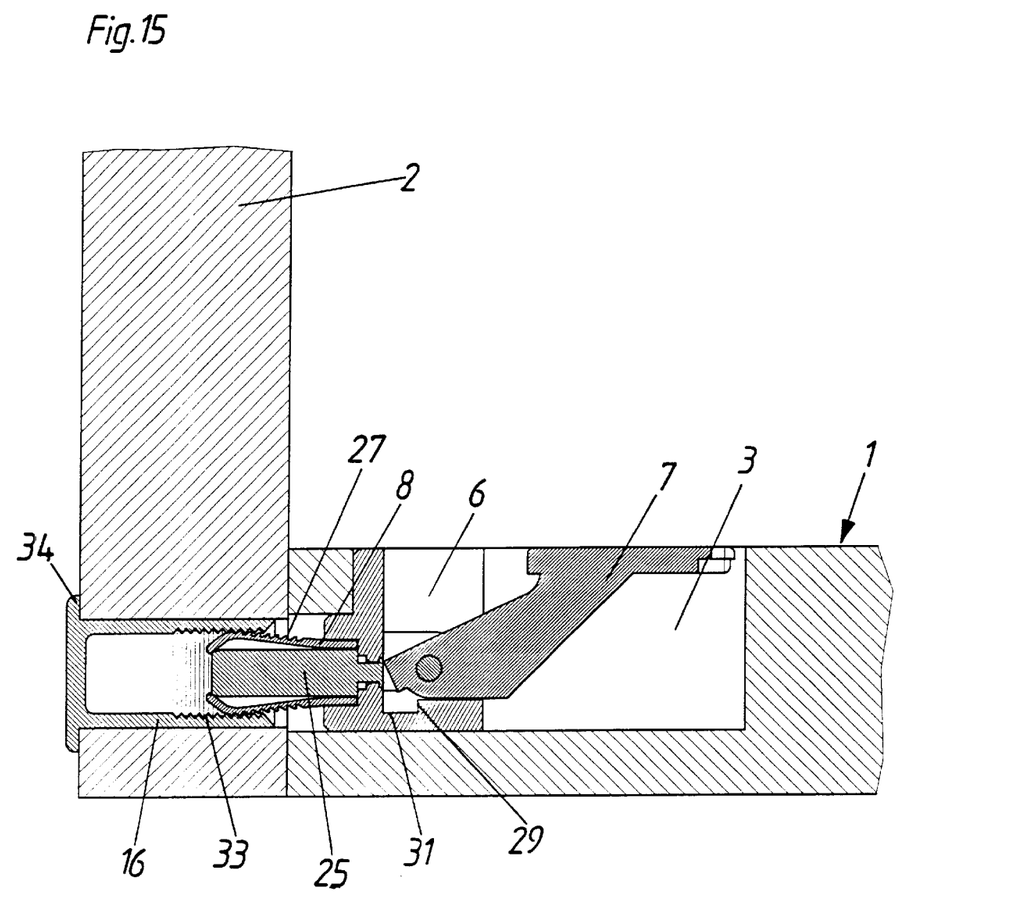

In the embodiment shown in FIG. 15 the bore 5 is a through bore and the dowel 16 is provided with a rim 34 abutting a front face of the furniture side wall 2.

At is inner side the dowel 16 is again provided with ribs 33 corresponding to ribs 27 of the dowel part 8 of the connecting fitting.

Figure 16:
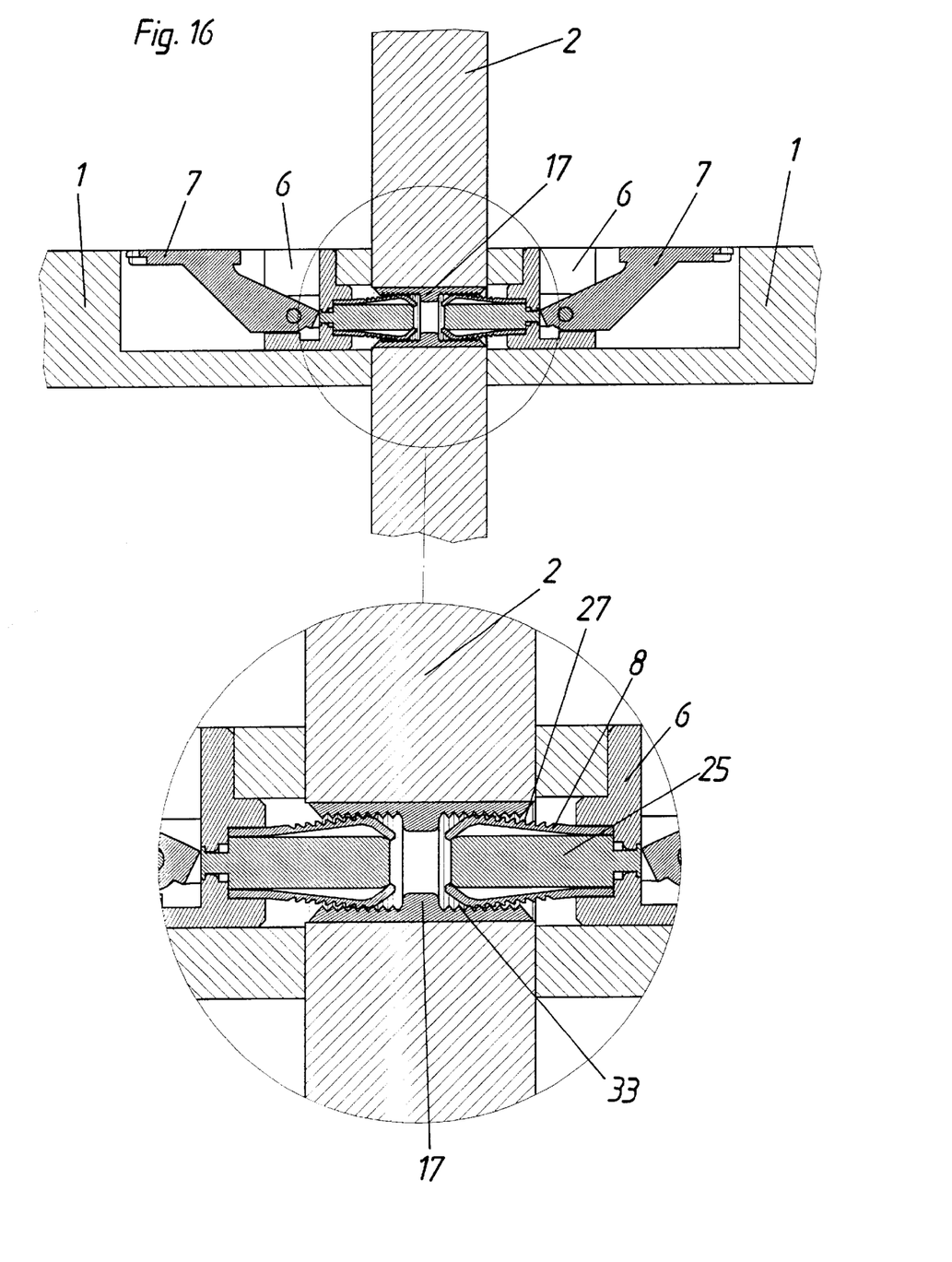

FIG. 16 shows a dowel 17 which makes it possible to connect two shelves 1 with a furniture side wall 2. The dowel 17 is on both ends provided with ribs 33 co-acting with ribs 27 on the dowel parts 8, whereby a secure hold of the dowel parts 8 in the dowel 17 is guaranteed.

Figure 17:
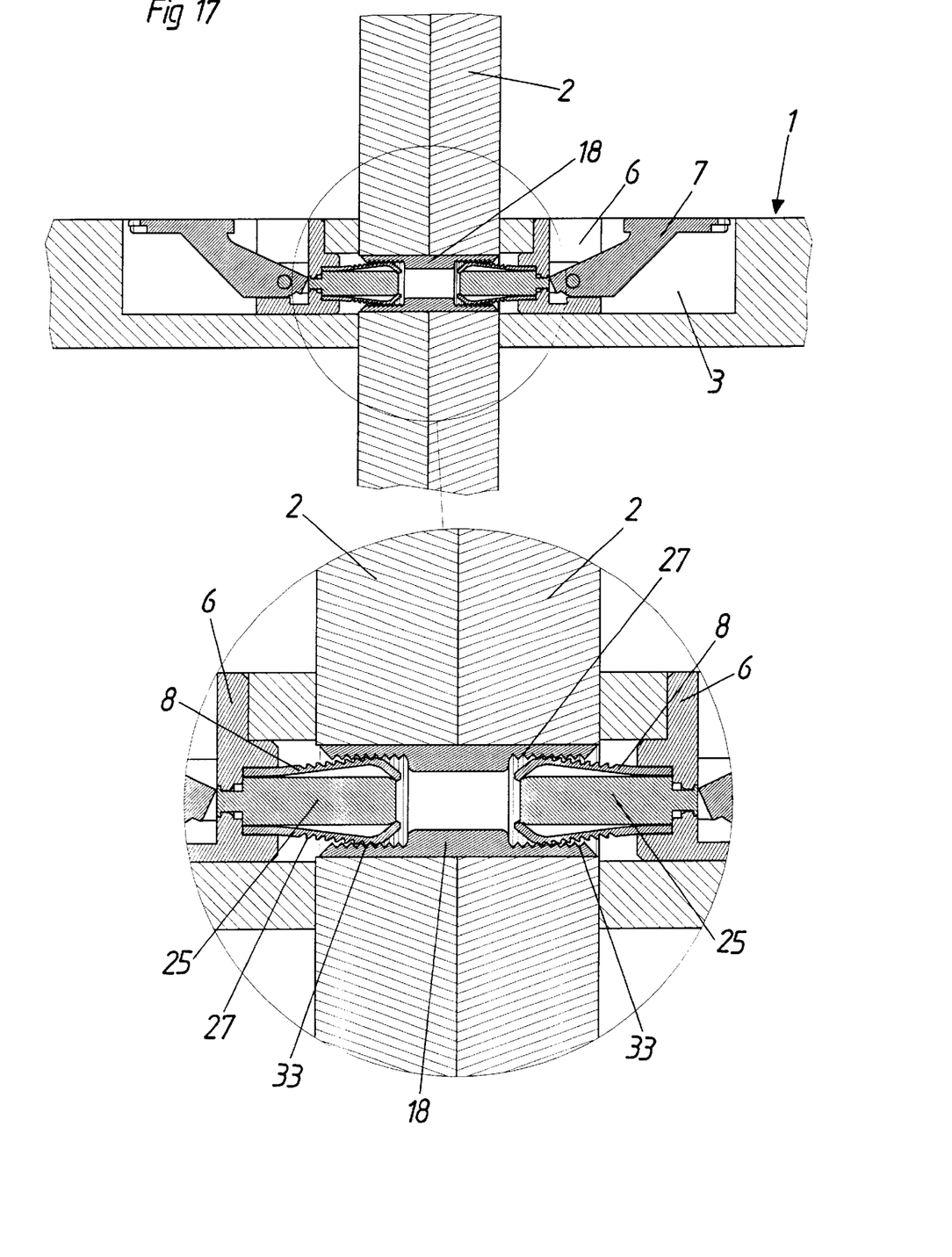

FIG. 17 shows the connection of two furniture side walls 2 and two shelves 1 by means of two connecting fittings according to the invention and one dowel 18. The dowel 18 is similar to the dowel 17, only longer.

To increase the stability and the hold of the fitting body 6 in the bore 3, the fitting body 6 is according to the embodiments shown in FIGS. 18 and 19a–19e provided with a strut which is in the form of a plate 21 that is integral with the fitting body 6. The plate 21 and fitting body 6 together describe a full circle so that the fitting body 6 and the plate 21 are snugly held in the bore 3.

Figures 18, 19A, 19B:
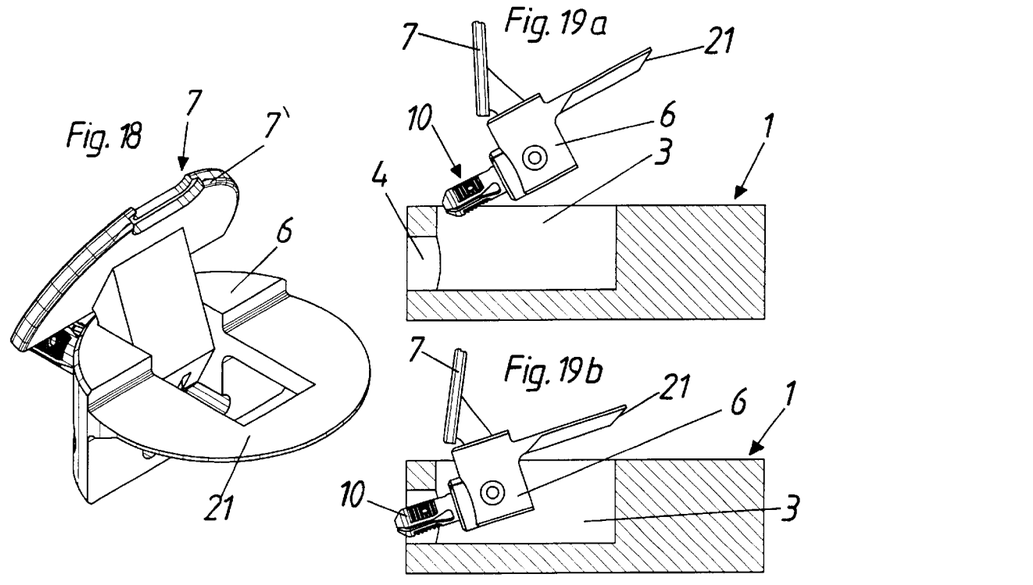
FIG. 18 is a perspective view of a further embodiment of a connecting fitting according to the invention.
FIGS. 19a–19e each show a sectional view through a shelf and a side view of a connecting fitting according to the invention, with the connecting fitting being shown at different stages of insertion into a bore in a shelf.
Figure 19C:
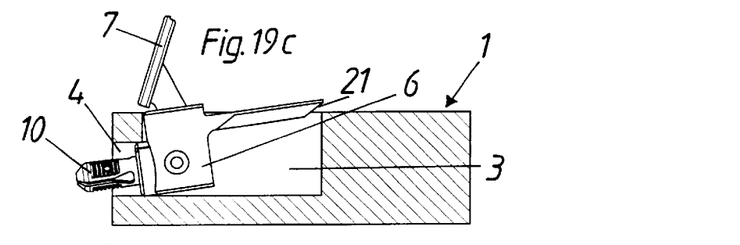
Figures 19D, 19E:
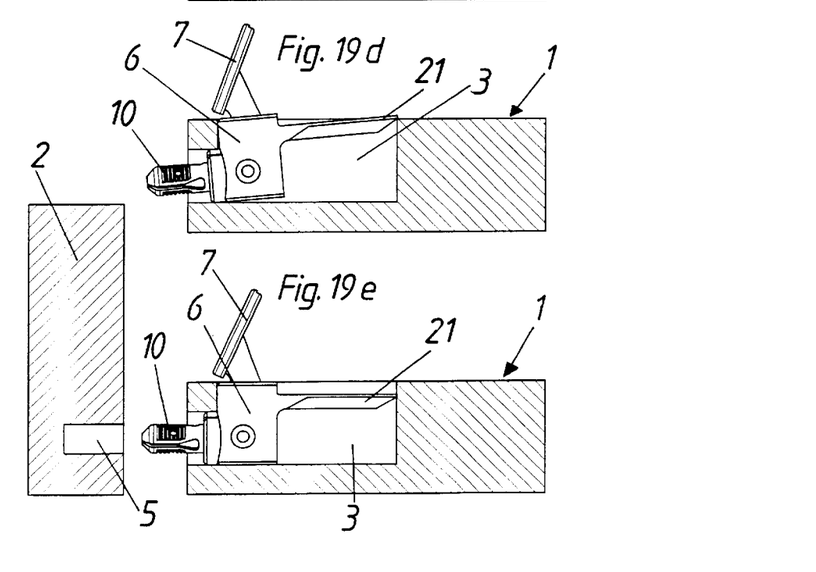
Figure 20:
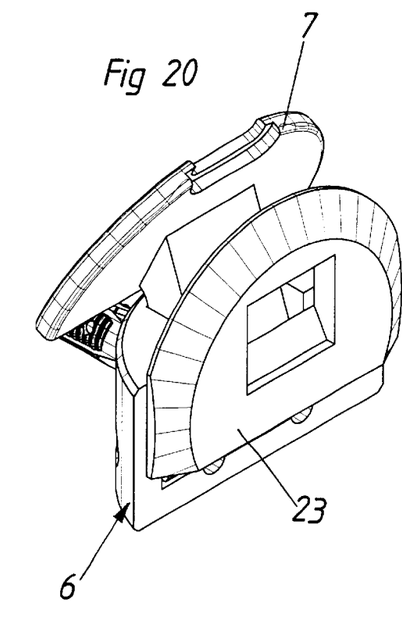
FIG. 20 is a perspective view of a further embodiment of a connecting fitting according to the invention, and FIGS. 21a–21e each show a sectional view through a shelf and a side view of a connecting fitting, whereby the connecting fitting is shown at different stages of being inserted into a bore in a shelf.
Figure 21A:
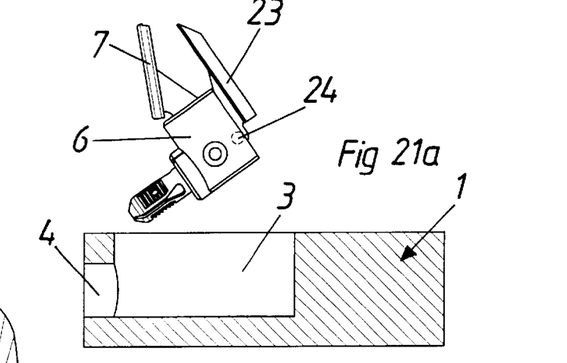
Figures 21B, 21C:
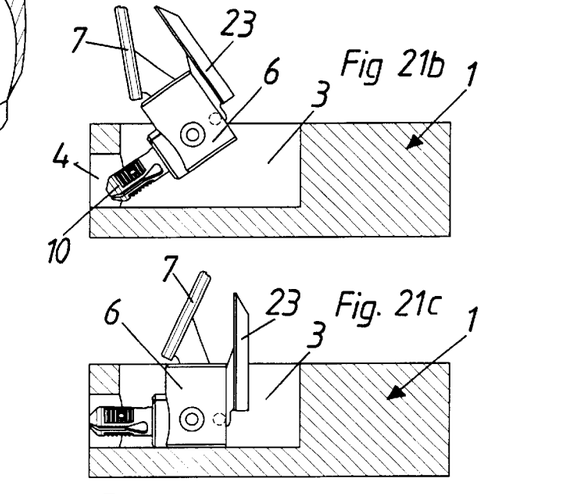
Figure 21D:
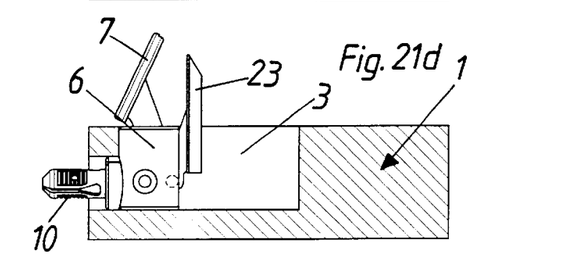
Figure 21E:
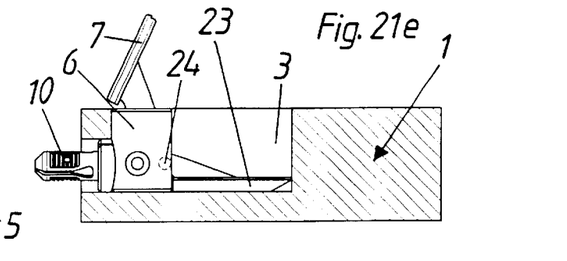

The plate 21 is positioned near the opening of the bore 3.

In the embodiment according to FIGS. 20 and 21a–21e the strut is in the form of a tiltable plate 23. When the fitting body 6 is inserted into the bore 3 the plate 23 is tilted upwardly just like the tilting lever 7. Afterwards, the fitting body 6 is inserted into the bore 3 as shown in FIGS. 21a to 21e and pushed forward so that the pin-shaped member 10 protrudes from the shelf 1. Afterwards, the plate 23 is tilted towards and into the bore 3, preferably to abut the base of the bore 3. Also, in this case the fitting body 6 and the plate 23 together generally describe a full circle to be snugly held within the bore 3, in such a way to provide a good hold of the fitting body 6 within the bore 3.

What is claimed is:

1. A connecting fitting for releasably connecting two furniture parts together, comprising:

a pin-shaped member that is insertable into a hole in a first furniture part;

a fitting body that is insertable into a bore in a second furniture part; and a tiltable member tiltably connected to said pin-shaped member, said tiltable member having a cam member for abutting against a wall of said fitting body such that tilting of said tiltable member causes displacement of said pin-shaped member so as to secure the first furniture part to the second furniture part in a tightened condition, wherein said fitting body comprises a circular cylindrical part having a curved side wall and a flat side wall, and is radially displaceable within the bore in the second furniture part when the first furniture part and the second furniture part are not secured in the tightened condition, wherein said curved side wall extends generally orthogonally from said flat side wall, and wherein said pin-shaped member extends from said curved side wall of said circular cylindrical part in a direction that is generally orthogonal to said flat side wall.

2. The connecting fitting as recited in claim 1, wherein said pin-shaped member comprises an expanding pin and a dowel part, such that tilting of said tiltable member causes displacement of said pin-shaped member by causing displacement of said dowel part relative to said expanding pin so as to secure the first furniture part to the second furniture part in the tightened condition.

3. The connecting fitting as recited in claim 2, wherein said expanding pin is rigidly connected to said fitting body.

4. The connecting fitting as recited in claim 1, wherein said pin-shaped member comprises a dowel.

5. The connecting fitting as recited in claim 4, wherein said dowel includes a dowel part and an expanding pin, with said expanding pin being connected to said fitting body, and with said tiltable member being connected to said dowel part such that tilting of said tiltable member causes displacement of said dowel part relative to said expanding pin.

6. The connecting fitting as recited in claim 1, further comprising a strut extending from said flat side wall of said circular cylindrical part.

7. The connecting fitting as recited in claim 6, wherein said strut is constructed and arranged to abut against a wall of the bore in the second furniture part when said fitting body is inserted into the bore in the second furniture part.

8. The connecting fitting as recited in claim 6, wherein said strut comprises a plate having a partially circular circumference.

9. The connecting fitting as recited in claim 8, wherein said partially circular circumference of said strut and a circumference of said curved side wall of said circular cylindrical part in combination generally define a circle.

10. The connecting fitting as recited in claim 8, wherein said plate is tiltably connected to said fitting body.

11. The connecting fitting as recited in claim 8, wherein said plate is integral with said fitting body and is constructed and arranged to be situated in a front region of the bore in the second furniture part.

12. The connecting fitting as recited in claim 6, wherein said strut is tiltably connected to said fitting body.

13. The connecting fitting as recited in claim 1, wherein said fitting body includes a socket at said curved side wall of said circular cylindrical part, and a rear end of said pin-shaped member is mounted in said socket.

14. The connecting fitting as recited in claim 13, wherein said socket extends from said curved side wall of said circular cylindrical part.

15. The connecting fitting according to claim 1, wherein said fitting body is radially displaceable within the bore in the second furniture part by having said flat side wall of said circular cylindrical part be of a length that is less than a diameter of the bore in the second furniture part, wherein the length of said flat side wall extends in a direction and defines a greatest dimension of said fitting body in said direction.

16. A connecting fitting in combination with two furniture parts for releasably connecting the two furniture parts together, comprising:
- a pin-shaped member that is insertable into a hole in a first furniture part;
- a fitting body that is insertable into a bore in a second furniture part; and
- a tiltable member tiltably connected to said pin-shaped member, said tiltable member having a cam member for abutting against a wall of said fitting body such that tilting of said tiltable member causes displacement of said pin-shaped member so as to secure said first furniture part to said second furniture part in a tightened condition,
wherein said fitting body comprises a circular cylindrical part having a curved side wall and a flat side wall, and is radially displaceable within said bore in said second furniture part when said first furniture part and said second furniture part are not secured in the tightened condition,
wherein said curved side wall extends generally orthogonally from said flat side wall, and
wherein said pin-shaped member extends from said curved side wall of said circular cylindrical part in a direction that is generally orthogonal to said flat side wall.

17. The connecting fitting as recited in claim 16, wherein said pin-shaped member comprises an expanding pin and a dowel part, such that tilting of said tiltable member causes displacement of said pin-shaped member by causing displacement of said dowel part relative to said expanding pin so as to secure the first furniture part to the second furniture part in the tightened condition.

18. The connecting fitting as recited in claim 17, wherein said expanding pin is rigidly connected to said fitting body.

19. The connecting fitting as recited in claim 16, wherein said pin-shaped member comprises a dowel.

20. The connecting fitting as recited in claim 19, wherein said dowel includes a dowel part and an expanding pin, with said expanding pin being connected to said fitting body, and with said tiltable member being connected to said dowel part such that tilting of said tiltable member causes displacement of said dowel part relative to said expanding pin.

21. The connecting fitting as recited in claim 16, further comprising a strut extending from said flat side wall of said circular cylindrical part.

22. The connecting fitting as recited in claim 21, wherein said strut is constructed and arranged to a but against a wall of said bore in said second furniture part when said fitting body is inserted into said bore in said second furniture part.

23. The connecting fitting as recited in claim 21, wherein said strut comprises a plate having a partially circular circumference.

24. The connecting fitting as recited in claim 23, wherein said partially circular circumference of said strut and a circumference of said curved side wall of said circular cylindrical part in combination generally define a circle.

25. The connecting fitting as recited in claim 23, wherein said plate is tiltably connected to said fitting body.

26. The connecting fitting as recited in claim 23, wherein said plate is integral with said fitting body and is constructed and arranged to be situated in a front region of said bore in said second furniture part.

27. The connecting fitting as recited in claim 21, wherein said strut is tiltably connected to said fitting body.

28. The connecting fitting as recited in claim 16, wherein said fitting body includes a socket at said curved wall of said circular cylindrical part, and a rear end of said pin-shaped member is mounted in said socket.

29. The connecting fitting as recited in claim 28, wherein said socket extends from said curved side wall of said circular circumferential part.

30. The connecting fitting according to claim 16, wherein said fitting body is radially displaceable within said bore in said second furniture part by having said flat side wall of said circular cylindrical part be of a length that is less than a diameter of said bore in said second furniture part, wherein the length of said flat side wall extends in a direction and defines a greatest dimension of said fitting body in said direction.

* * * * *